United States Patent
Kimura et al.

(10) Patent No.: US 8,643,796 B2
(45) Date of Patent: Feb. 4, 2014

(54) LIQUID CRYSTAL DISPLAY DEVICE

(75) Inventors: Hiroyuki Kimura, Saitama-ken (JP); Hiroshi Tabatake, Saitama-ken (JP); Tetsuya Kawamura, Saitama-ken (JP)

(73) Assignee: Japan Display Central Inc., Fukaya-shi (JP)

( * ) Notice: Subject to any disclaimer, the term of this patent is extended or adjusted under 35 U.S.C. 154(b) by 417 days.

(21) Appl. No.: 12/952,532

(22) Filed: Nov. 23, 2010

(65) Prior Publication Data
US 2011/0157504 A1    Jun. 30, 2011

(30) Foreign Application Priority Data
Dec. 25, 2009 (JP) ............................ 2009-296252

(51) Int. Cl.
*G02F 1/1343* (2006.01)

(52) U.S. Cl.
USPC ............... 349/39; 349/12; 345/173; 345/175; 345/156

(58) Field of Classification Search
USPC ................ 349/37–39, 12; 345/173, 175, 156
See application file for complete search history.

(56) References Cited

U.S. PATENT DOCUMENTS

| | | | |
|---|---|---|---|
| 7,391,053 B2 * | 6/2008 | Iizuka et al. | 257/59 |
| 2006/0290864 A1 * | 12/2006 | Oh et al. | 349/141 |
| 2008/0036751 A1 * | 2/2008 | Yamazaki | 345/205 |
| 2008/0062148 A1 * | 3/2008 | Hotelling et al. | 345/174 |
| 2009/0046077 A1 * | 2/2009 | Tanaka et al. | 345/174 |
| 2009/0237606 A1 * | 9/2009 | Higano et al. | 349/139 |
| 2009/0251615 A1 * | 10/2009 | Tsubata | 348/725 |
| 2009/0310076 A1 * | 12/2009 | Hsieh et al. | 349/144 |
| 2009/0315845 A1 * | 12/2009 | Alexander | 345/173 |
| 2010/0002162 A1 * | 1/2010 | Morimoto et al. | 349/38 |
| 2010/0053098 A1 * | 3/2010 | Tsuzaki et al. | 345/173 |
| 2010/0110035 A1 * | 5/2010 | Selker | 345/174 |
| 2011/0149178 A1 * | 6/2011 | Uno | 348/790 |

FOREIGN PATENT DOCUMENTS

| | | |
|---|---|---|
| CN | 101305338 A | 11/2008 |
| JP | 2009-199093 | 9/2009 |

OTHER PUBLICATIONS

Office Action issued Sep. 24, 2012 in Chinese Patent Application No. 201010589566.4 (with English translation).

* cited by examiner

*Primary Examiner* — Edward Glick
*Assistant Examiner* — Sang V Nguyen
(74) *Attorney, Agent, or Firm* — Oblon, Spivak, McClelland, Maier & Neustadt, L.L.P.

(57) ABSTRACT

In one embodiment, a liquid crystal display device having a plurality of pixels includes a first substrate having an insulating substrate, a first detection element extending in a first direction above the insulating substrate, a second detection element extending in a second direction crossing the first direction and an insulating film provided between the first and second detection circuits. A second substrate is arranged opposing to the first substrate so as to hold a liquid crystal layer therebetween. A detection circuit is provided on the first substrate to detect change of electrostatic capacitance between the first and second detection elements. At least one of the first and second detection elements is an element required for operating the liquid crystal layer.

5 Claims, 16 Drawing Sheets

LIQUID CRYSTAL DISPLAY DEVICE

CROSS-REFERENCE TO RELATED APPLICATION

This application is based upon and claims the benefit of priority from prior Japanese Patent Application No. 2009-296252, filed Dec. 25, 2009, the entire contents of which are incorporated herein by reference.

FIELD

This invention relates to a liquid crystal display device with a touch sensing function.

BACKGROUND

In recent years, a flat panel display device has been actively developed, and especially, a liquid crystal display device among the flat panel display devices is applied to various fields taking advantage of the features, such as a light weight, a thin shape, and a low power consumption.

According to Japanese Patent Application Laid Open No. P2009-199093, for example, a liquid crystal display touch screen is disclosed. The liquid crystal display touch screen includes a first polalizer, a second polalizer and first and second substrates. Touch sensing elements are arranged between the first and second polalizers, not between the first and second substrates.

BRIEF DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
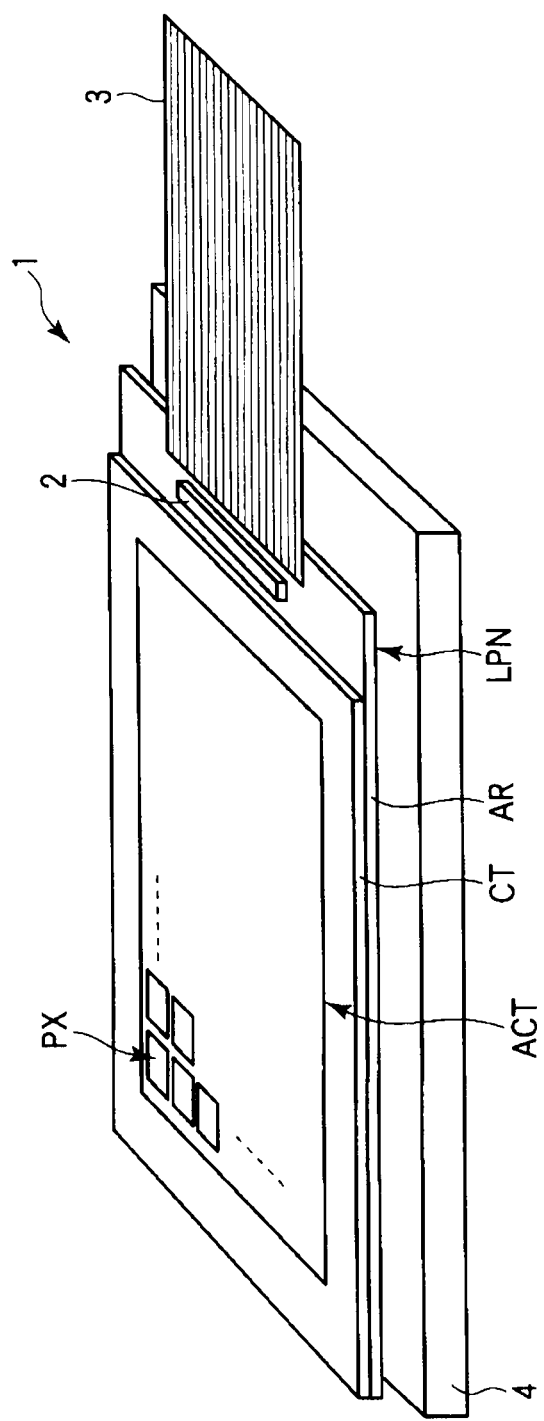
FIG. 1 schematically shows a structure of a liquid crystal display device according to a first embodiment of the invention.

A liquid crystal display device according to an exemplary embodiment of the present invention will now be described with reference to the accompanying drawings wherein the same or like reference numerals designate the same or corresponding parts throughout the several views.

According to one embodiment of this invention, a liquid crystal display device having a plurality of pixels includes: a first substrate including an insulating substrate, a first detection element extending in a first direction above the insulating substrate, a second detection element extending in a second direction crossing the first direction and an insulating film provided between the first and second detection circuits, a second substrate opposing to the first substrate; a liquid crystal layer held between the first and second substrates; and a detection circuit to detect change of electrostatic capacitance between the first and second detection elements; wherein at least one of the first and second detection elements is an element required for operating the liquid crystal layer.

According to other embodiment of this invention, a liquid crystal display device having a plurality of pixels includes: a first substrate including; an insulating substrate, a signal line arranged above the insulating substrate and extending in a first direction, a first insulating film covering the signal line, a capacitance line arranged on the first insulating film and extending in a second direction crossing the first direction, the capacitance line including a slit formed above a portion of the signal line and extending in the first direction, a second insulating film covering the capacitance line, and a plurality of pixel electrodes arranged on the second insulating film so as to face the capacitance line, the respective pixel electrodes including a plurality of slits, and a second substrate opposing to the first substrate; a liquid crystal layer held between the first and second substrates; and a detection circuit to detect change of electrostatic capacitance between the signal line and the capacitance line.

According to other embodiment of this invention, a liquid crystal display device having a plurality of pixels includes: a first substrate including; an insulating substrate, a capacitance line arranged above the insulating substrate and extending in a first direction, an insulating film covering the capacitance line, a plurality of pixel electrodes respectively arranged above the insulating film in the pixel so as to face the capacitance line, the pixel electrode including a plurality of slits respectively extending to a second direction crossing the first direction, and a signal line arranged between adjacent pixel electrodes above the insulating film and extending in the second direction, a second substrate opposing to the first substrate; a liquid crystal layer held between the first and second substrates; and a detection circuit to detect change of electrostatic capacitance between the signal line and the capacitance line.

FIG. 1 schematically shows a structure of a liquid crystal display device according to a first embodiment of the invention.

A liquid crystal display device 1 includes a liquid crystal display panel LPN of an active matrix type, a driver IC chip 2 and a flexible wiring substrate 3 connected with the liquid crystal display panel LPN, and a back light 4 to illuminate the liquid crystal display panel LPN.

The liquid crystal display panel LPN includes an array substrate (first substrate) AR, a counter substrate (second substrate) CT opposing to the array substrate AR, and a liquid crystal layer held between the substrates (not illustrated). The liquid crystal display panel LPN includes an active area ACT to display pictures. The active area ACT is constituted by a plurality of pixels PX arranged in a matrix of (m×n). (m, n: positive integer).

In the illustrated embodiment, the back light 4 is arranged at a back side of the array substrate AR. In such a case, although a detection plane to detect a touch by an object and a display surface are formed in the counter substrate CT side. However, when the back light 4 is arranged at the counter substrate CT side, the display surface and the detection plane are formed in the array substrate AR side. As for the backlight 4, various types may be used, for example, a light emitting diode (LED) and a cold cathode fluorescent (CCFL) may be used as a light source of the back light 4, while explanation is omitted about the detailed structure of the backlight 4.

Figure 2:
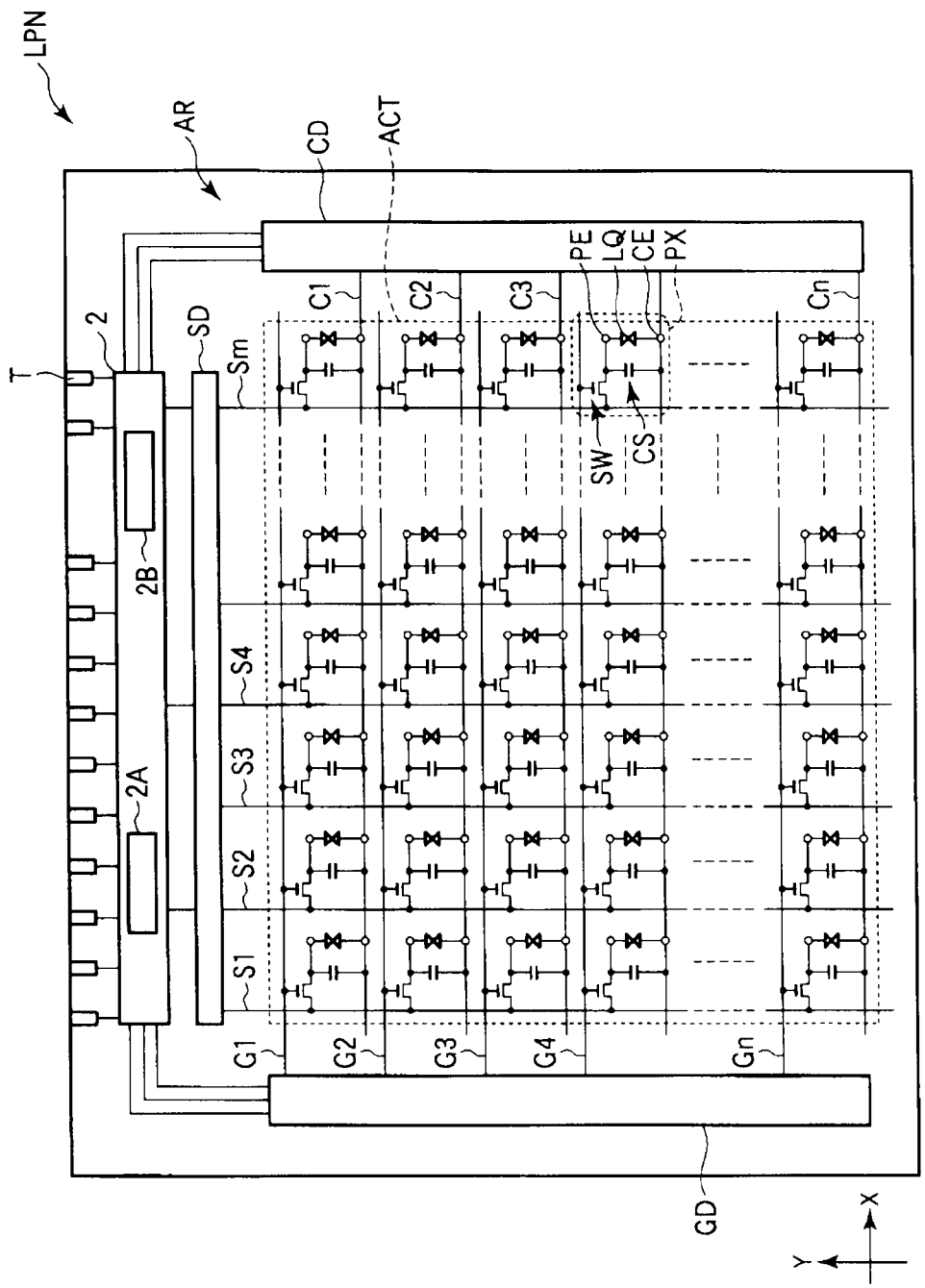
FIG. 2 shows a structure and an equivalent circuit of the liquid crystal display panel shown in FIG. 1.

FIG. 2 shows a structure and an equivalent circuit of the liquid crystal display panel LPN shown in FIG. 1.

The array substrate AR includes n gate lines G (G1-Gn) and n capacitance lines C (C1-Cn) respectively extending in a X direction in the active area ACT, m source lines S (S1-Sm) respectively extending in a Y direction which crosses the X direction, (m×n) switching elements SW electrically connected with the gate lines G and the source lines S in each pixel PX, (m×n) pixel electrodes PE connected with the respective switching elements SW in each pixel PX, and a counter electrode CE opposing to the pixel electrodes, which is a part of the capacitance line C. A retentive capacitance Cs is formed between the capacitance line C and the pixel electrode PE. The liquid crystal layer LQ is held between the pixel electrode PE and the counter electrode CE.

Each gate line G is pulled out to the outside of the active area ACT and is connected to a first driver circuit GD. Each source line S is pulled out to the outside of the active area ACT and is connected to a second driver circuit SD. Each capacitance line C is pulled out to the outside of the active area ACT and is connected to a third driver circuit CD. The first driver circuit GD, the second driver circuit SD, and the third driver circuit CD are formed on the array substrate AR and are connected with the driver IC chip 2.

In the illustrated example, the driver IC chip 2 is mounted on the array substrate AR in the outside of the active area ACT of the liquid crystal display panel LPN. In addition, though illustration of the flexible wiring substrate 3 is omitted, terminals T for connecting the flexible wiring substrate are formed at one edge of the array substrate AR. The terminals T are connected to the driver IC chip 2 through various lines.

In this embodiment, the driver IC chip 2 includes an image signal write-in circuit 2A to perform a control required for writing an image signal in the pixel electrode PE of each pixel PX in the image display mode which displays a picture on the active area ACT. Furthermore, the driver IC chip 2 includes a detection circuit 2B to detect change of the electrostatic capacitance between the capacitance line C and the source line S in the detection mode which detects the touch by an object in the detection plane. Details are explained later.

In this embodiment, the liquid crystal display panel LPN includes the pixel electrode PE and the counter electrode CE formed on the array substrate AR. The liquid crystal display panel LPN uses the Fringe Field Switching (FFS) mode in which liquid crystal molecules constituting the liquid crystal layer LQ are switched by mainly a lateral electrical field formed between the pixel electrode PE and the counter electrode CE. The lateral electrical field is almost in parallel with surfaces of the substrates.

First, a liquid crystal display panel LPN according to the first embodiment is explained.

Figure 3:
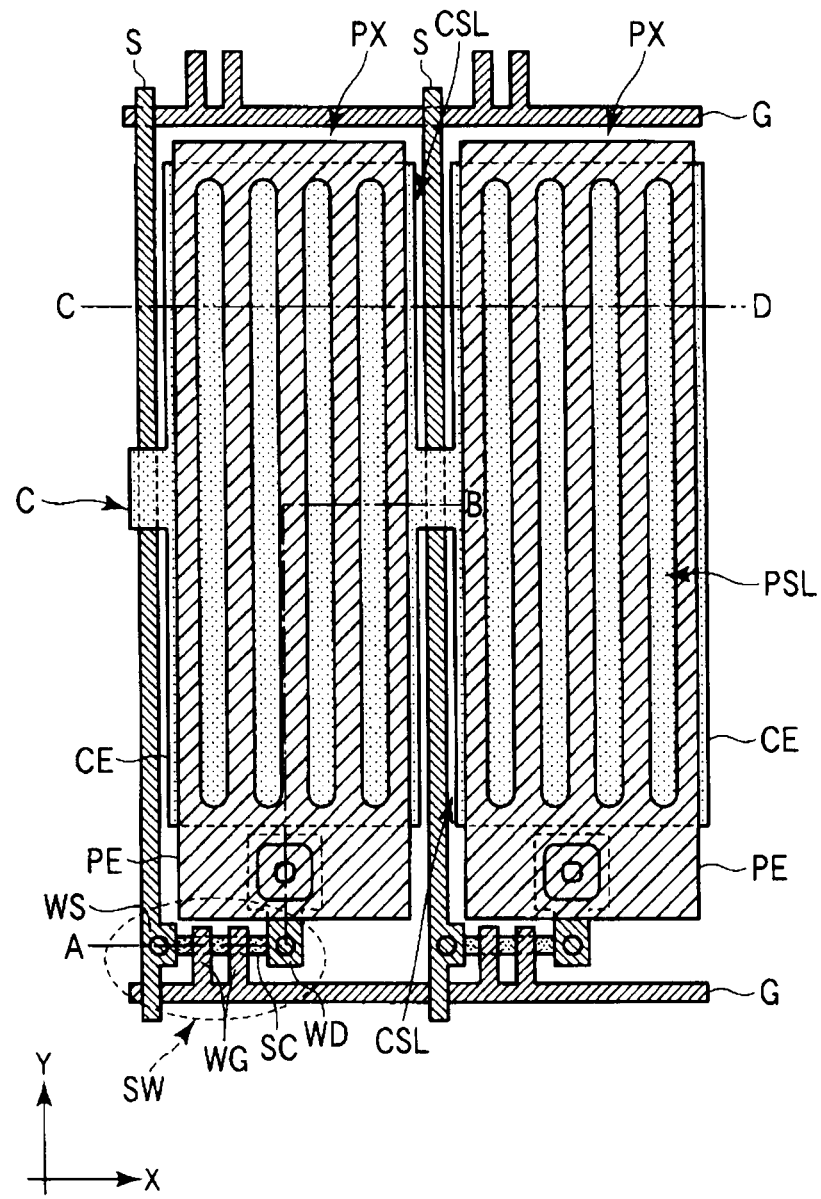
FIG. 3 is a plan view showing a pattern of pixels on an array substrate shown in FIG. 2 looking from a counter substrate side.

FIG. 3 is a plan view showing a pattern of pixels on the array substrate AR shown in FIG. 2 looking from the counter substrate side.

The gate line G extends in the X direction. The source line S extends in the Y direction. The switching element SW is arranged near the intersection portion of the gate line G and source line S and is constituted by a thin film transistor (TFT). The switching element SW includes a semiconductor layer SC. The semiconductor layer SC is formed of poly-silicon, amorphous silicon, etc. In this embodiment, the semiconductor layer SC is formed of poly-silicon.

A gate electrode WG of the switching element SW is located right above the semiconductor layer SC and is electrically connected with the gate line G (in the illustrated example, the gate electrode WG is integrally formed with the gate line G). A source electrode WS of the switching element SW is electrically connected with the source line S (in the illustrated example, the source electrode WS is integrally formed with the source line 5). A drain electrode WD of the switching element SW is electrically connected with the pixel electrode PE.

The capacitance line C extends in the X direction. Namely, the capacitance line C is arranged in each pixel PX and extends above the source line S. The capacitance line C is commonly used for the respective pixels PX arranged adjacent in the X direction. The capacitance line C includes the counter electrode CE formed corresponding to each pixel PX. Each counter electrode CE is formed integrally and is electrically connected above the source line S each other. In the illustrated example, the capacitance line C is commonly used for the pixel PXs arranged in one line in the X direction between two gate lines G which adjoin in the Y direction.

A slit CSL extending in the Y direction is formed in the capacitance line C in a portion right above the source line S. In the illustrated example, the slit CSL is formed in two portions right above the same source line S. Each of the slits CSL extends from respective portions near the adjacent gate lines G to a center portion between the adjacent gate lines G. That is, each counter electrode CE which adjoins in the X direction is connected above the same source line S in the approximate center between the two adjoining gate lines G.

The pixel electrode PE of each pixel PX is arranged above the counter electrode CE. Each pixel electrode PE is formed in an island shape corresponding to the pixel form, for example, an approximately square shape in each pixel PX. The pixel electrodes PE are respectively connected to the drain electrodes WD of the switching elements SW. A plurality of slits PSL are formed in each pixel electrode PE. In the illustrated example, four slits PSL extend in the Y direction in each pixel electrode PE. Of course, the slits PSL are formed above the counter electrode CE.

Figure 4:
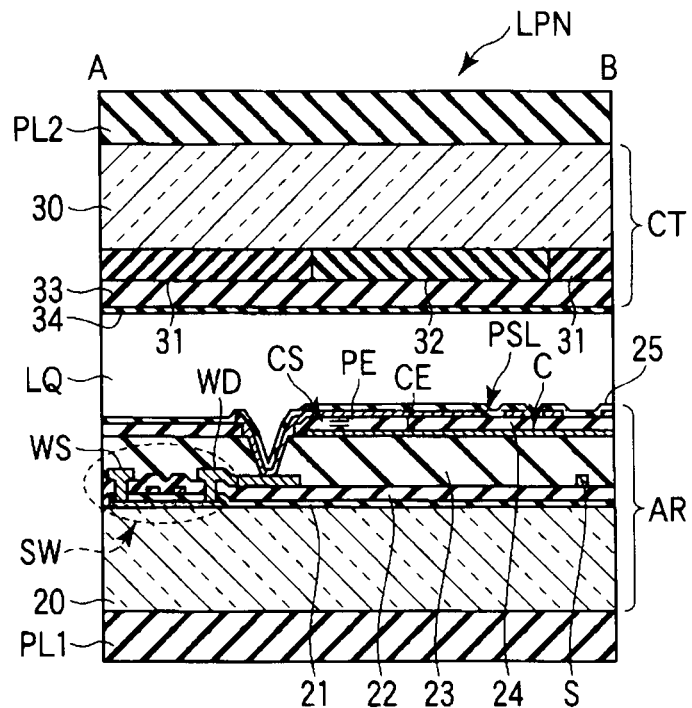
FIG. 4 is a cross-sectional view of the pixel taken along line A-B of FIG. 3.

FIG. 4 is a cross-sectional view of the pixel PX taken along line A-B of FIG. 3.

The array substrate AR is formed using an insulating transmissive substrate 20, such as a glass substrate, etc. The array substrate AR includes the switching element SW in an inside surface (namely, a face contacting with the liquid crystal layer LQ) of the insulating substrate 20. The switching element SW shown here is a thin film transistor of a top gate type. The semiconductor layer SC is arranged on the insulating substrate 20. The semiconductor layer SC is covered with a gate insulating film 21. Moreover, the gate insulating film 21 is arranged also on the insulating substrate 20.

The gate electrode WG of the switching element SW is arranged on the gate insulating film 21 and is located right above the semiconductor layer SC. The gate electrode WG is covered with a first interlayer insulating film 22. Moreover, the first interlayer insulating film 22 is arranged also on the gate insulating film 21. The gate insulating film 21 and first interlayer insulating film 22 are formed, for example, of inorganic system materials, such as silicon nitride (SiN).

The source electrode WS and the drain electrode WD of the switching element SW are arranged on the first interlayer insulating film 22. The source electrode WS and the drain electrode WD are respectively in contact with the semiconductor layer SC through a contact hole which penetrates the gate insulating film 21 and the first interlayer insulating film 22. The gate electrode WG, source electrode WS, and the drain electrode WD are formed of electric conductive materials, such as molybdenum, aluminum, tungsten, and titanium.

The source electrode WS and the drain electrode WD are covered with an organic insulating film 23. Moreover, the organic insulating film 23 is arranged also on the first interlayer insulating film 22.

The capacitance line C or the counter electrode CE is arranged on the organic insulating film 23. The capacitance line C or the counter electrode CE is covered with a second interlayer insulating film 24. Moreover, the second interlayer insulating film 24 is arranged also on the organic insulating film 23.

The pixel electrode PE is arranged on the second interlayer insulating film 24. The pixel electrode PE is connected to the drain electrode WD through a contact hole which penetrates the organic insulating film 23 and the second interlayer insulating film 24. The slits PSL are formed in the pixel electrode PE. The capacitance line C, the counter electrode CE, and the pixel electrode PE are formed of electric conductive and transmissive materials, such as Indium Tin Oxide (ITO), Indium Zinc Oxide (IZO), etc. The pixel electrode PE and the counter electrode CE facing each other through the second interlayer insulating film 24 form a retention capacitance CS. The pixel electrode PE is covered with an alignment film 25.

The alignment film 25 is arranged in the surface of the array substrate AR which contacts with the liquid crystal layer LQ.

On the other hand, the counter substrate CT is formed using an insulating transmissive substrate 30, such as a glass substrate, etc. The counter substrate CT includes a black matrix 31 to lay out each pixel PX and a color filter 32 in an inside surface (namely, a surface contacting with the liquid crystal layer LQ) of the insulating substrate 30.

The black matrix 31 on the insulating substrate 30 is arranged so that the black matrix 31 opposes to the line portions, such as the gate lines G, the source lines S, and also the switching elements SW on the array substrate AR. The black matrix 31 is formed of a black colored resin, or metal material having light blocking characteristics, such as chromium (Cr), etc.

The color filter 32 is arranged on the insulating substrate 30 and is formed of resin material colored in different colors, for example, three primary colors of red, blue, and green, respectively. The resin material colored in red is arranged corresponding to a red pixel, the resin material colored in blue is similarly arranged corresponding to a blue pixel, and the resin material colored in green is arranged corresponding to a green pixel.

In the liquid crystal display panel LPN using the lateral electrical field as mentioned above, it is preferable that the surface of the counter substrate CT contacting with the liquid crystal layer LQ is flat. Therefore, the counter substrate CT further includes an overcoat layer 33 which makes unevenness of the surface of the black matrix 31 and the color filter 32 flat. In the illustrated example, the overcoat layer 33 is arranged on the black matrix 31 and the color filter 32. The overcoat layer 33 is covered with an alignment film 34. The alignment film 34 is arranged on the surface of the counter substrate CT which contacts with the liquid crystal layer LQ. The alignment films 25 and 34 are formed, for example, with polyimide.

The array substrate AR and the counter substrate CT are arranged so that the alignment film 25 counters the alignment film 34 each other. A spacer, for example, a pillar-shaped spacer formed of resin material integrally with one of the substrates is arranged between the array substrate AR and the counter substrate CT, which is not shown. Thereby, a predetermined gap is formed between the substrates. The array substrate AR and the counter substrate CT are sealed by a shield element together so as to maintain the predetermined gap.

The liquid crystal layer LQ is formed of the liquid crystal composite enclosed in the gap formed between the alignment film 25 on the array substrate AR and the alignment film 34 on the counter substrate CT.

A polarizing plate PL1 is arranged on one external surface of the liquid crystal display panel LPN, i.e., the external surface of the insulating substrate 20 which constitutes the array substrate AR. Moreover, a polarizing plate PL2 is arranged on an external surface of another side of the liquid crystal display panel LPN, i.e., an external surface of the insulating substrate 30 which constitutes the counter substrate CT. In particular, in the illustrated example, a shield electrode is not provided between the insulating substrate 30 and polarizing plate PL2.

Figure 5:
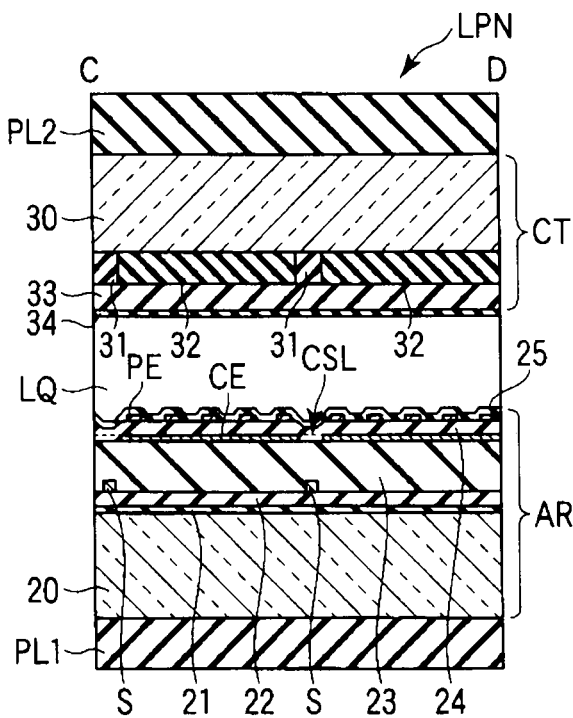
FIG. 5 is a cross-sectional view of the pixels taken along line C-D of FIG. 3.

FIG. 5 is a cross-sectional view of the pixels PX taken along line C-D of FIG. 3.

The source line S is arranged on the first interlayer insulating film 22. As mentioned above, the source line S is formed integrally with the source electrode WS and is arranged in the same layer as the source electrode WS. The source line S is covered with the organic insulating film 23 as well as the source electrode WS.

The counter electrode CE is arranged between adjoining two source lines S. The slit CSL formed in the capacitance line C is arranged right above the source line S. In the position in which the slit CSL is formed, the second interlayer insulating film 24 is arranged on the organic insulating film 23. On the second interlayer insulating film 24, the pixel electrode PE faces the counter electrode CE. The slits PSL of the pixel electrode PE are formed, for example, in a pitch of 5-6 μm.

The gap between the array substrate AR and the counter substrate CT, i.e., the thickness of the liquid crystal layer LQ between the alignment film 25 and the alignment film 34 is, for example, 3 μm.

Moreover, the black matrix 31 of the counter substrate CT is located right above the source line S and also above the slit CSL of the capacitance line C.

In the embodiment shown in FIG. 5, the back light which is not illustrated is arranged at the side which faces the polarizing plate PL1, and the surface of the polarizing plate PL2 becomes a detection plane. Moreover, in the embodiment shown in FIG. 5, the organic insulating film 23 is a first insulating film used to support the capacitance line C while covering the source line S, and the second interlayer insulating film 24 is a second insulating film used to support the pixel electrode PE while covering the capacitance line C. Moreover, the source line S and the capacitance line C are not only liquid crystal driver elements required for driving the liquid crystal layer LQ respectively, but also detection elements required for sensing the touch by an object. The second interlayer insulating film 24 is an insulating layer arranged between two detection elements.

Figure 6:
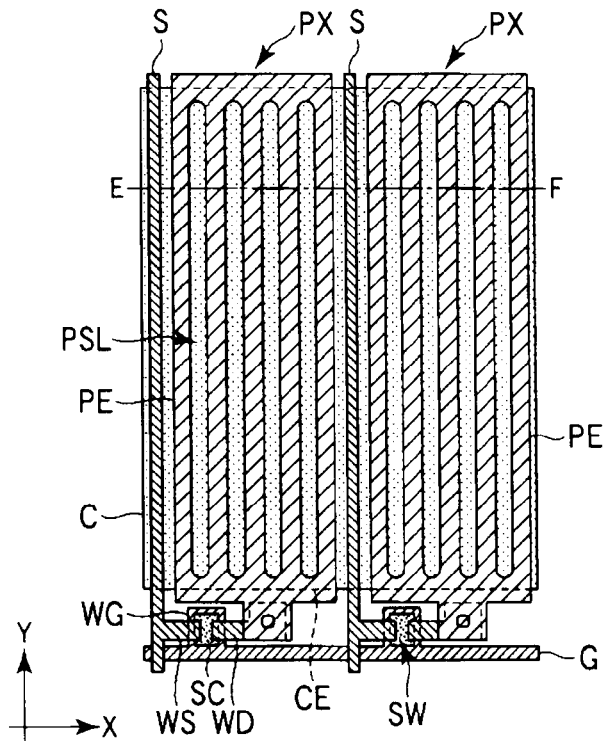
FIG. 6 is a plan view showing other pattern of pixels on the array substrate shown in FIG. 2 looking from the counter substrate side.

FIG. 6 is a plan view showing other pattern of pixels on the array substrate AR shown in FIG. 2 looking from the counter substrate side. In the embodiment shown in FIG. 6, it is different from the embodiment shown in FIG. 3 with the point that the switching element SW includes the semiconductor layer SC formed of amorphous silicon, and the point that the slit is not formed in the capacitance line C.

A portion of the gate line G forms the gate electrode WG of the switching element SW. The semiconductor layer SC which is formed of amorphous silicon is located right above the gate electrode WG. The capacitance line C formed in a belt shape extends in the X direction. That is, the slit is not formed in the capacitance line C. The capacitance line C includes the counter electrode CE formed corresponding to each pixel PX. In addition, other structures are the same as those of the embodiment shown in FIG. 3.

Figure 7:
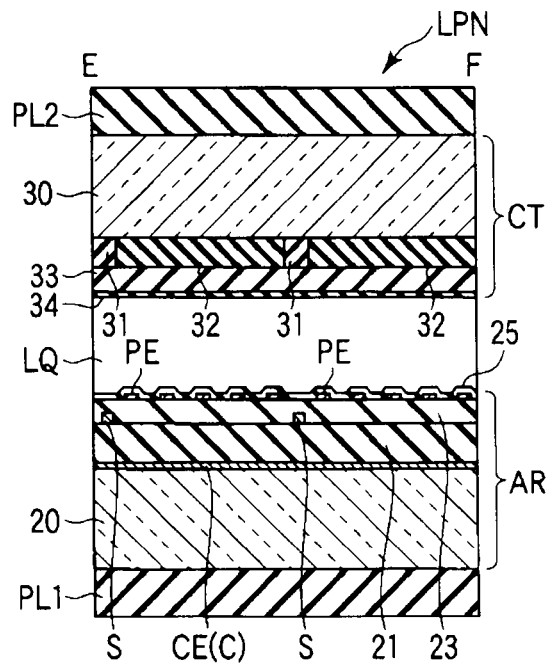
FIG. 7 is a cross-sectional view of the pixels taken along line E-F of FIG. 6.

FIG. 7 is a cross-sectional view of the pixels PX taken along line E-F of FIG. 6.

In the array substrate AR, the capacitance line C including the counter electrode CE is arranged on the insulating substrate 20 and is covered with a first interlayer insulating film 21. The source line S is arranged on the first interlayer insulating film 21 and is covered with an organic insulating film 23. The slit is not formed in the capacitance line C under the source line S. The pixel electrode PE is arranged on the organic insulating film 23. Other compositions of the array substrate AR and the counter substrate CT are the same as those of the embodiment shown in FIG. 5.

Next, an image display mode and a detection mode in the liquid crystal display panel LPN as described above are explained.

Figure 8:
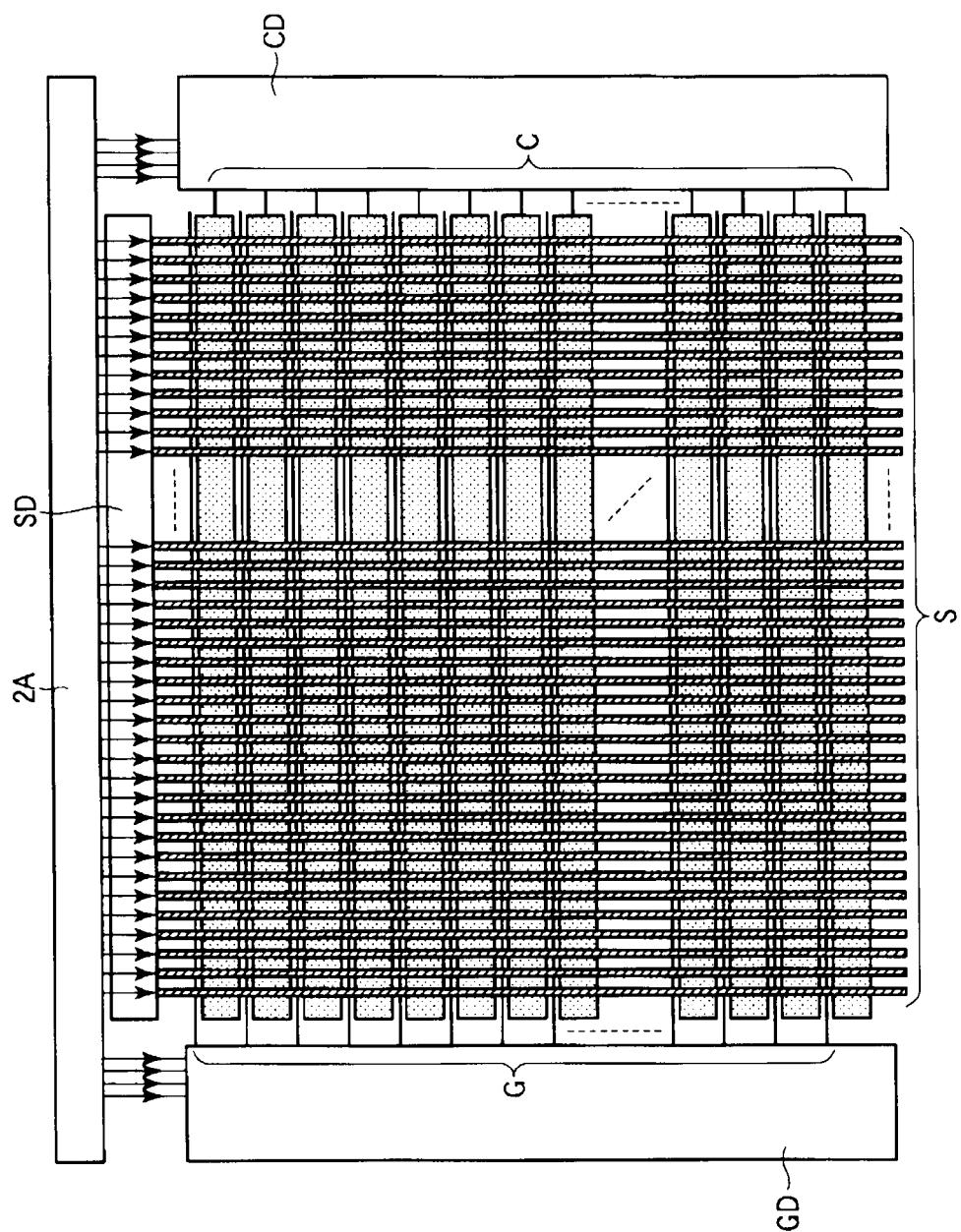
FIG. 8 is a block diagram for explaining a writing operation of image signals in an image display mode.

FIG. 8 is a block diagram for explaining a writing operation of image signals in the image display mode.

The image signal write-in circuit 2A outputs a control signal to each gate line G to set the switching element SW to the ON state by controlling the first driver circuit GD. Moreover, the image signal write-in circuit 2A outputs the image signal to each source line S by controlling the second driver circuit SD. The image signal outputted to the source line S is written in the pixel electrode PE through the conducted switching element SW. On the other hand, the image signal write-in circuit 2A controls the third driver circuit CD to supply a common voltage to each capacitance line C.

Thereby, the voltage corresponding to the image signal is impressed to the liquid crystal layer LQ between the pixel electrode PE and the counter electrode CE of the capacitance line C. In the liquid crystal layer LQ, the liquid crystal molecule aligns according to the impressed voltage. Consequently, a modulation rate to the light passing in the liquid crystal layer LQ changes. For this reason, the incident light to the liquid crystal display panel LPN from the back light selectively passes in the polarizing plate PL2 depending on the voltage applied between the pixel electrode PE and the counter electrodes CE. Thereby, the picture corresponding to the image signal is displayed on the display surface.

Figure 9:
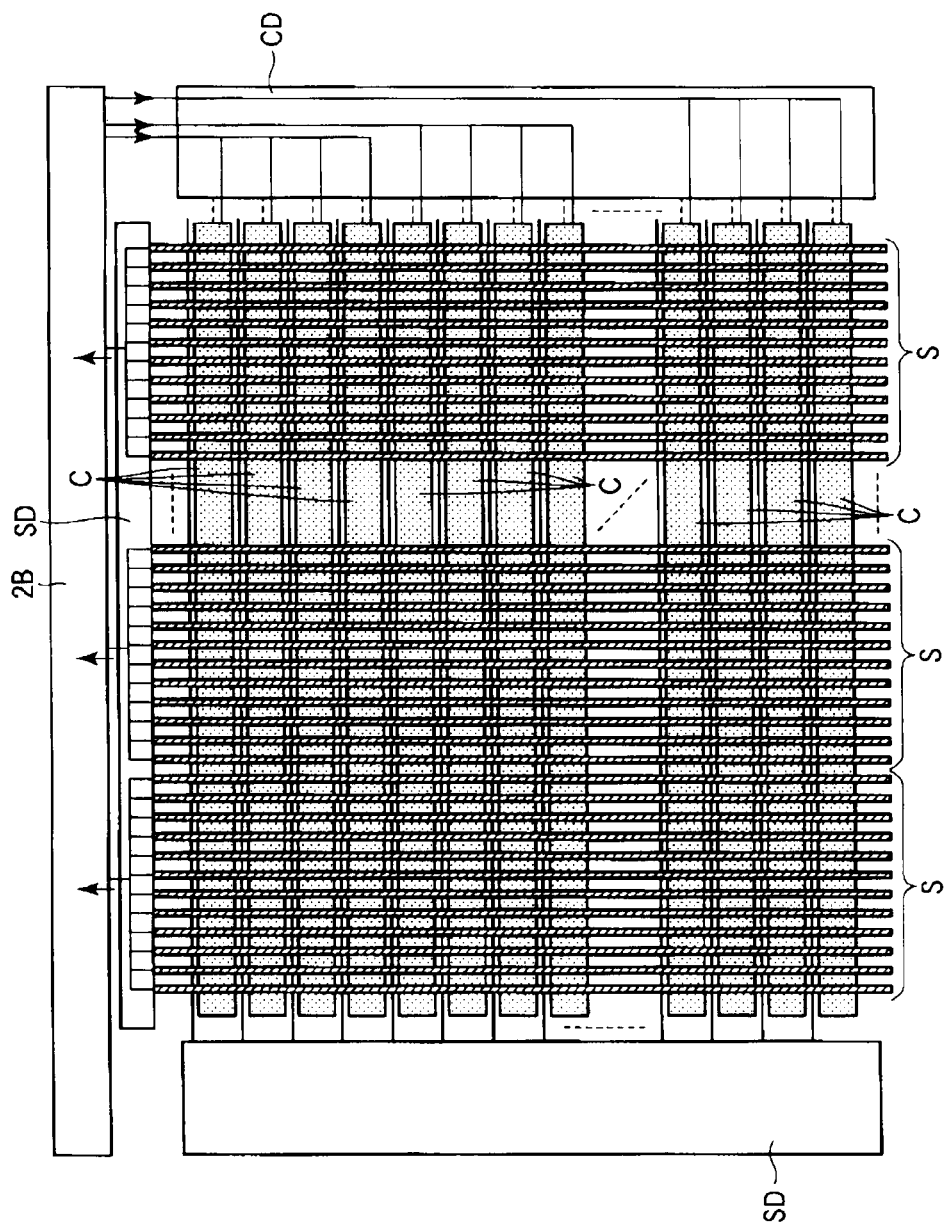
FIG. 9 is a block diagram for explaining a writing operation of a detection signal and a detection operation in a detection mode.

FIG. 9 is a block diagram for explaining the writing operation of the detection signal and the detection operation in the detection mode. In addition, the pixel electrode PE is in a floating state in the detection mode.

A detection circuit 2B writes the detection signal in the capacitance line C by controlling the third driver circuit CD. Here, the detection signal is, for example, an alternate signal. At this time, the third driver circuit CD simultaneously writes the detection signal to the plurality of adjoining capacitance lines C, that is, four adjacent capacitance lines C in this embodiment. Namely, the capacitance lines C are divided into some groups to use the capacitance lines as the detection elements. The third driver circuit CD includes one or more switches connected to each capacitance line C and sequentially supplies the common voltage to the respective capacitance lines C in the display mode. On the other hand, the detection signal is written into the respective capacitance lines C by making the switches connected to the plurality of the capacitance lines C simultaneously ON state.

Furthermore, the detection circuit 2B pre-charges each source line S by controlling the second driver circuit SD. Since an alternate detection signal is written in the capacitance line C, the potential of the source line S changes. The detection circuit 2B reads the potential change of the source line S at this time. When an object approaches to or touches the detection plane, an electrostatic capacitance between the capacitance line C and the source line S changes. A potential fluctuation of the source line S also changes with the change of the electrostatic capacitance. For this reason, in the detection circuit 2B, the change of the electrostatic capacitance between the capacitance line C and the source line S, namely, the approach or touch by an object to the detection plane, is detected by monitoring the change of the potential fluctuation or a current value of the source line S.

In this embodiment, the second driver circuit SD simultaneously reads the potential change or the current value change of two or more source lines S, specifically, twelve adjacent source lines S in the illustrated example. This is a way to make groups of the source lines S constituting some blocks, and to use the source lines S as detection elements. The second driver circuit SD includes one or more switches connected to the respective capacitance lines C and writes the image signal into the respective source lines S by sequentially conducting the switches SW in the display mode. On the other hand, the potential change or the current value change is read after the source lines S are pre-charged by simultaneously making the switches connected to the respective source lines S conductive state in the detection mode.

In addition, the detection signal is written in the capacitance line C, and the potential change in the source line S accompanied with the change of the electrostatic capacitance is read in the illustrated example. However, the detection signal may be written in the source line S, and the potential change in the capacitance line C accompanied with the change of electrostatic capacitance may be read. Moreover, in the detection mode, the number of grouped capacitance lines and the source lines S is set according to required detection sensitivity.

Moreover, in the detection mode, the grouping of the capacitance lines C and the source lines S which are detection elements, may be changed for every timing. For example, the accuracy of the detection is improvable by grouping the adjacent two or more detection elements (the capacitance lines C and source lines S) at the first timing, and by changing the combination of the grouping at the second timing. The detection elements may be grouped in various ways, for example, by using half number of the detection elements grouped at the first timing, for example, every other detection element, or every two detection elements. Such combination for the grouping can be arbitrarily changed by the combination of the switches connected to the detection elements.

Figure 10:
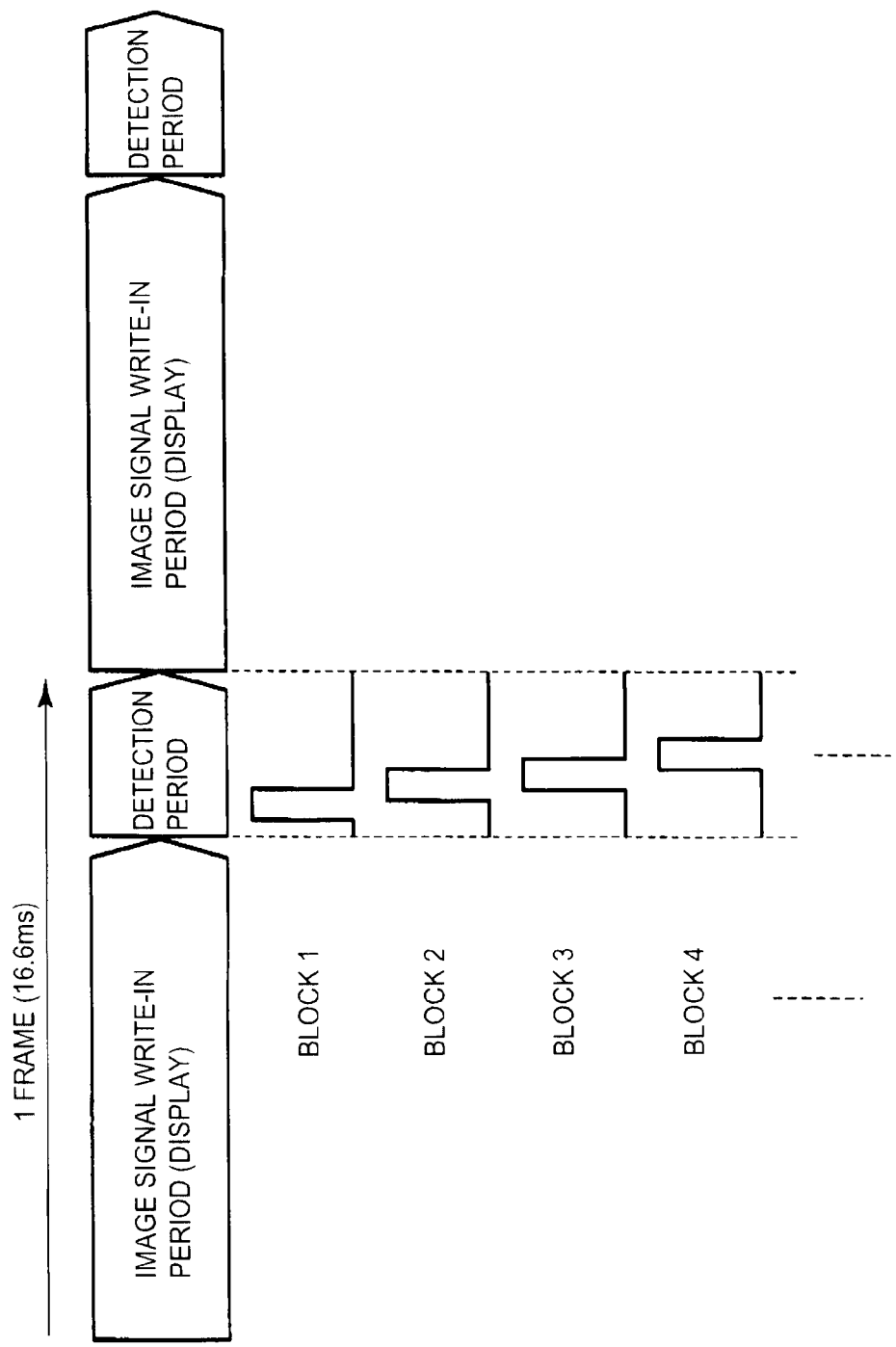
FIG. 10 is a diagram for explaining the relation between an image signal write-in period to perform the image display mode, and a detection period to perform the detection mode.

FIG. 10 is a diagram for explaining the relation between an image signal write-in period to perform the image display mode, and a detection period to perform the detection mode.

When frame frequency is 60 Hz, one-frame period is about 16.6 ms. One frame period contains the image signal write-in period and the detection period following the image signal write-in period. A detection period is, for example, a blanking period until the image signal write-in period of the following frame comes. In the detection period, as mentioned above, the detection signal is written in the detection elements using the source line S and the capacitance line C as the detection elements, and the change of the electrostatic capacitance between the source line S and the capacitance line C is detected.

In the detection period, the detection operation of the blocks of the source lines S is sequentially performed for every block of the capacitance lines C.

In addition, as for the potential of the capacitance line C, it is preferable to return the potential of the capacitance line C from the written potential of the detection signal to the original potential before writing the detection signal in order to reduce the influence on the display picture in the following frame. That is, the average alternate signal potential of the capacitance line C is preferably the same as the original potential of the capacitance line C.

According to the structure of the first embodiment as described above, some additional elements for detecting the object in the detection plane is not needed because the source line S and the capacitance line C constituting the liquid crystal display panel LPN are used as the detection elements. Thereby, it becomes possible to offer the liquid crystal display device with the detection function at low cost.

Moreover, it becomes possible to raise the detection sensitivity by simultaneously writing the detection signal into two or more source lines S and capacitance lines C, and simultaneously reading the change of the electrostatic capacitance from the source lines S and capacitance lines C.

Furthermore, since the driver IC chip 2 in which the image signal write-in circuit 2A and the detection circuit 2B are formed integrally is mounted on the array substrate AR of the liquid crystal display panel LPN incorporating the detection elements, further external elements are unnecessary, and it is advantageous to miniaturization.

In this embodiment, the surface of the polarizing plate PL2 forms the detection plane, and the source line S and the capacitance line C of the array substrate AR are used as the detection elements for detecting the object in the detection plane. Accordingly, a shield electrode formed between the detection plane and the detection elements at whole surface in parallel with the substrates is not arranged. That is, the polarizing plate PL2 is adhered to the external surface of the insulating substrate 30 which constitutes the counter substrate CT.

Figure 11:
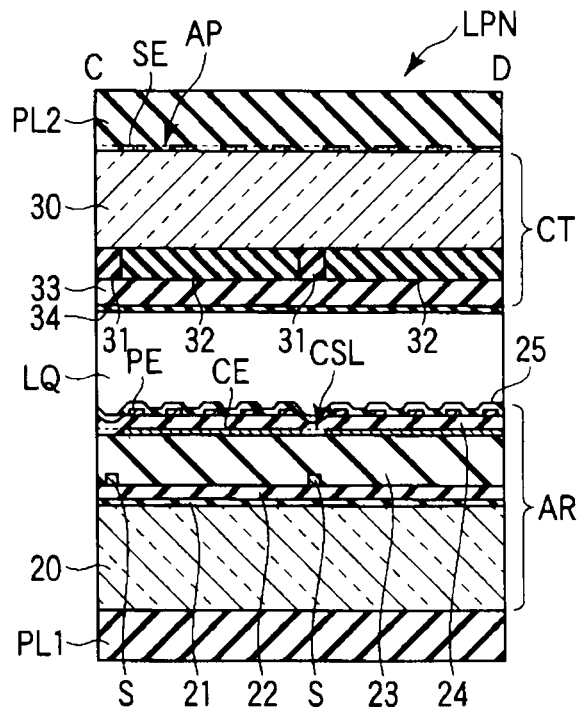
FIG. 11 is a cross-sectional view of other pixels taken along line C-D of FIG. 3.
Figure 12:
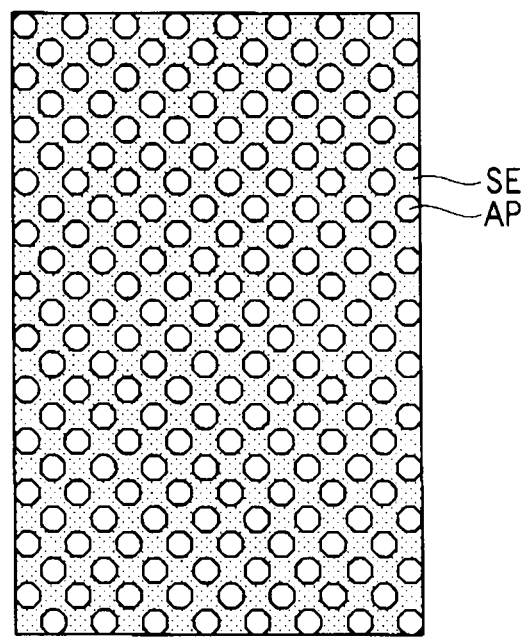
FIG. 12 is a plan view showing a shield electrode shown in FIG. 11.

An example shown in FIG. 11 is different from the example shown in FIG. 5 with the point that a mesh type shield electrode SE is arranged on the external surface of the insulating substrate 30. FIG. 12 is a plan view schematically showing the shield electrode SE shown in FIG. 11.

That is, the shield electrode SE is formed of a transmissive electric conductive material. Moreover, a plurality of apertures AP are formed in the shield electrode SE, and the apertures AP are formed at least on the detection region though the apertures AP are formed on the whole surface of the shield electrode SE in FIG. 12. In addition, the form and the layout of the apertures AP are not restricted to the illustrated example. For example, the apertures AP in the shield electrode SE may not be formed above the pixel PX and may be formed right above the black matrix 31.

The shield electrode SE shields an unnecessary electrical influence such as static electricity from outside environment to drive the liquid crystal molecules in the image display mode. For this reason, it is possible to suppress the penetration of the undesirable electrical field to the liquid crystal layer LQ.

In addition, although illustration is omitted, a conductive paste may be used to adhere the polarizing plate PL2 on the external surface of the insulating substrate 30 in place of the shield electrode SE shown in FIG. 11.

Figure 13:
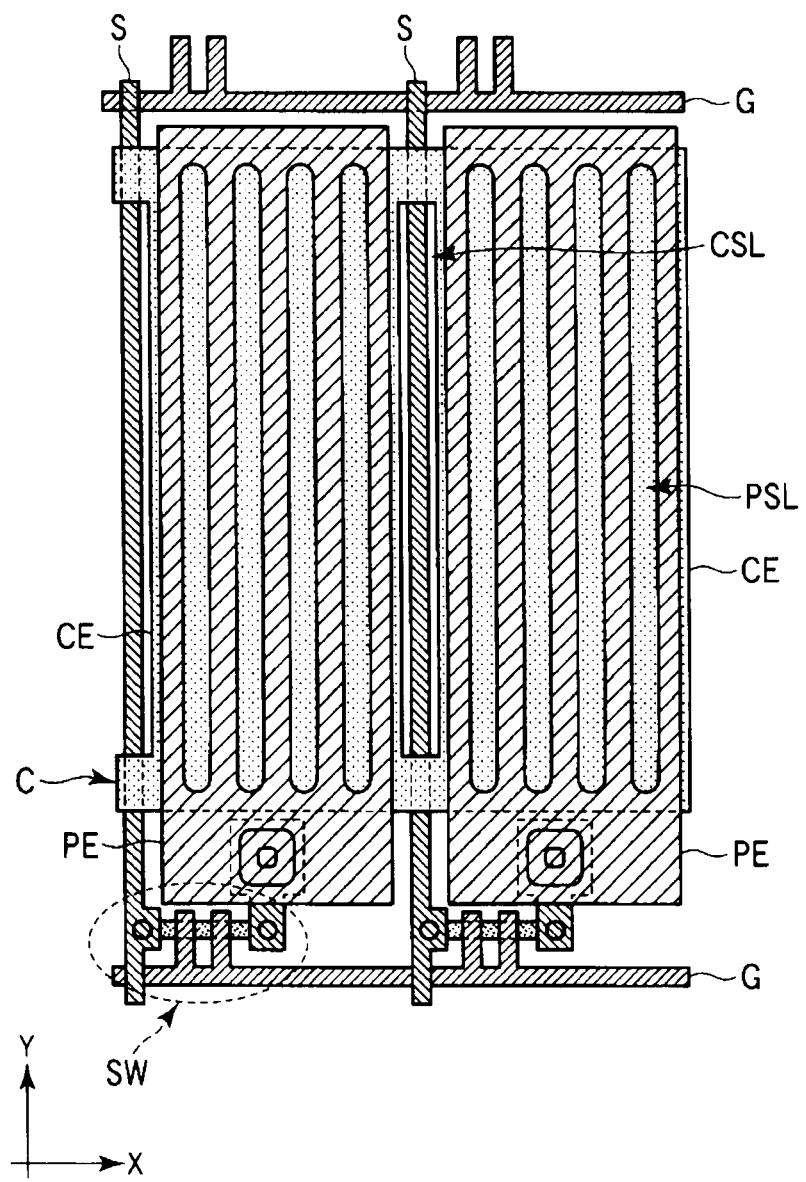
FIG. 13 is a plan view showing other pattern of the pixels on the array substrate shown in FIG. 2 looking from the counter substrate side.

An example shown in FIG. 13 is different from that shown in FIG. 3 in the shape of the slit CSL formed in the capacitance line C.

That is, in the example shown in FIG. 13, the capacitance line C includes the counter electrode CE formed corresponding to each pixel PX which adjoins in the X direction and is arranged between two gate lines G which adjoin in the Y direction. The slit CSL is formed at one place in right above the same source line S. The slit CSL is formed in the approximate center between the adjoining gate lines G and extends in the Y direction. That is, each counter electrode CE which adjoins in the X direction is connected each other above the source line S and at two portions respectively adjacent to the adjoining two gate lines G.

As for the slit CSL located right above the source line S, the slit CSL is preferable to be formed as large as possible from a viewpoint of improvement in the detection sensitivity. However, on the other hand, if the area of the slit CSL is expanded in the capacitance line C, the area of the portion electrically connected with the adjoining counter electrodes CE becomes small. Accordingly, the resistance of the capacitance line C tends to increase.

Figure 14:
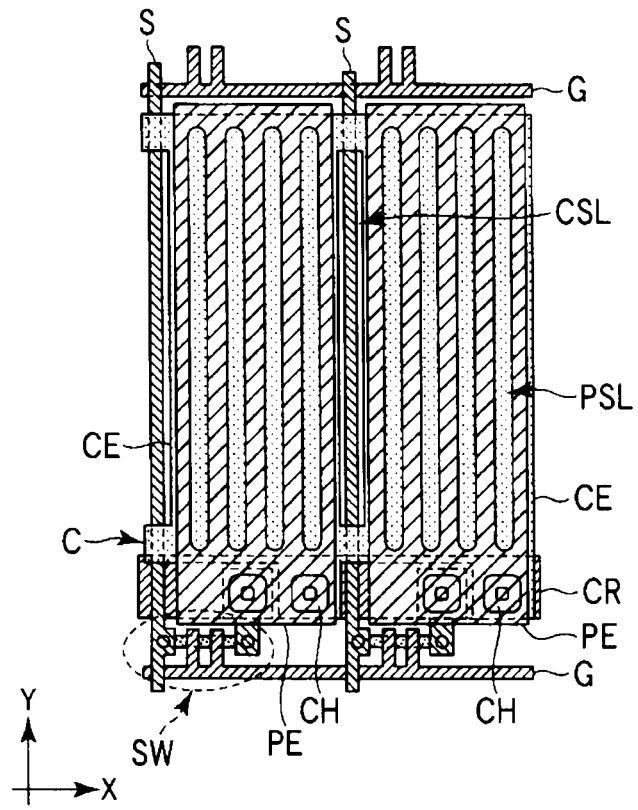
FIG. 14 is a plan view showing other pattern of the pixels on the array substrate shown in FIG. 2 looking from the counter substrate side.
Figure 15:
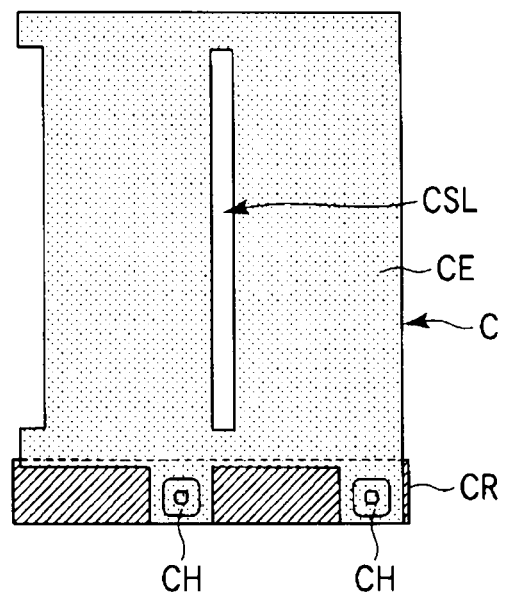
FIG. 15 is a plan view showing a connection state of a capacitance line and an auxiliary capacitance line in FIG. 14.

An example shown in FIG. 14 is different from that shown in FIG. 13 with the point that an auxiliary capacitance line CR electrically connected with the capacitance line C is arranged. FIG. 15 is a plan view schematically showing the connection state of the capacitance line C and the auxiliary capacitance line CR shown in FIG. 14.

The auxiliary capacitance line CR extends in the X direction. The auxiliary capacitance line CR is arranged, for example, at a lower layer than the capacitance line C and the source line S, and is arranged at the same layer as the gate line G. Moreover, the auxiliary capacitance line CR may be formed in the same process using the same material as the gate line G. The auxiliary capacitance line CR and the capacitance line C are electrically connected through a contact hole CH formed in each pixel PX. That is, the same potential as the capacitance line C is impressed to the auxiliary capacitance line CR connected with the capacitance line C.

Figure 16:
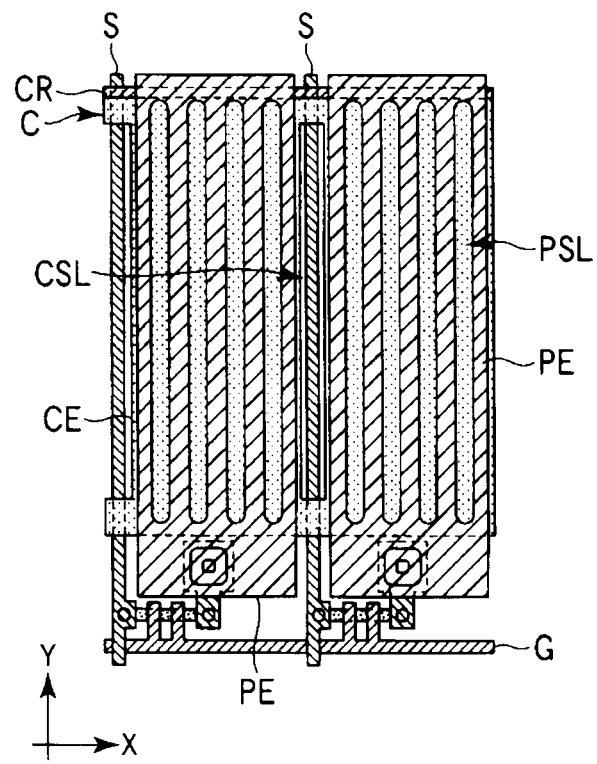
FIG. 16 is a plan view showing other pattern of the pixels on the array substrate shown in FIG. 2 looking from the counter substrate side.
Figure 17:
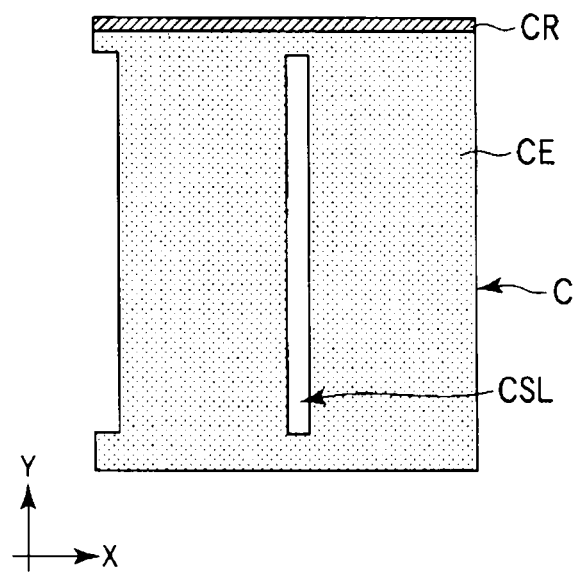
FIG. 17 is a plan view showing a connection state of the capacitance line and the auxiliary capacitance line shown in FIG. 16.

An example shown in FIG. 16 is different from that shown in FIG. 14 with the point that the auxiliary capacitance line CR electrically connected to the capacitance line C is formed in a different process from the gate line G. FIG. 17 is a plan view schematically showing a connection state of the capacitance line C and the auxiliary capacitance line CR shown in FIG. 16.

The auxiliary capacitance line CR extends in the X direction at a portion other than the slit CSL of the capacitance line C. For example, the auxiliary capacitance line CR is formed in the same layer as the capacitance line C, and the auxiliary capacitance line CR and the capacitance line C are directly and electrically connected each other. The same potential as the capacitance line C electrically connected to the auxiliary capacitance line CR is impressed to the auxiliary capacitance line CR.

The auxiliary capacitance line CR and the capacitance line C may be arranged in a different layer through an interlayer insulating film. In that case, the auxiliary capacitance line CR and the capacitance line C are electrically connected through a contact hole.

According to above structure, it becomes possible to suppress the increase in the resistivity of the capacitance line C due to the formation of the slit CSL.

Next, a liquid crystal display panel LPN according to a second embodiment is explained.

Figure 18:
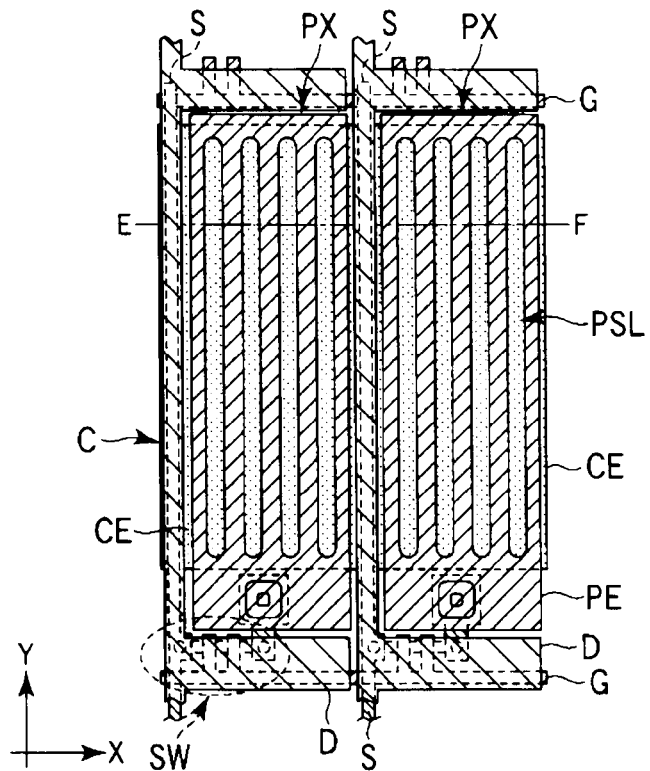
FIG. 18 is a plan view showing other pattern of the pixels on the array substrate shown in FIG. 2 looking from the counter substrate side.

FIG. 18 is a plan view showing other pattern of the pixels PX on the array substrate AR shown in FIG. 2 looking from the counter substrate CT side.

The gate line G extends in the X direction, and the source line S extends in the Y direction. The switching element SW is arranged near the intersection portion of the gate line G and the source line S.

The capacitance line C extends in the X direction and is formed in a belt shape. That is, the slit CSL which is explained in the first embodiment is not formed in the capacitance line C. The capacitance line C includes the counter electrode CE formed corresponding to each pixel PX. Each counter electrode CE is formed integrally and is electrically connected mutually above the source line S. The capacitance line C is commonly used for a plurality of pixel PXs arranged in one line in the X direction between two gate lines G which adjoin in the Y direction.

The pixel electrode PE of each pixel PX is arranged above the counter electrode CE and is electrically connected to the switching element SW.

Moreover, in this embodiment, it is different from the first embodiment shown in FIG. 3, etc. with the point that the detection line D is arranged between the pixel electrodes PE which adjoin in the X direction. That is, in the second embodiment, the detection line D is used as the detection element instead of using the source line S as the detection element. The detection line D extends in the Y direction. In the illustrated example, the detection line D is arranged above the source line S.

Figure 19:
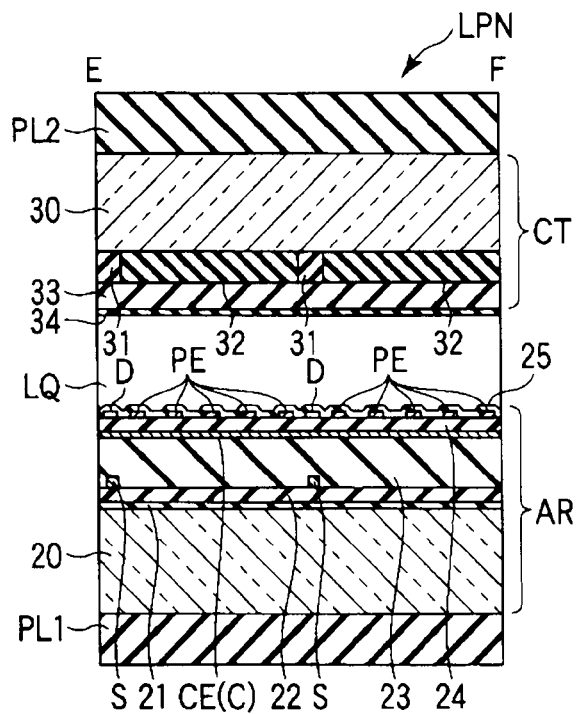
FIG. 19 is a cross-sectional view of other pixels taken along line E-F of FIG. 18.

FIG. 19 is a cross-sectional view of other pixels taken along line E-F of FIG. 18.

The inside surface of the insulating substrate 20 which constitutes the array substrate AR is covered with the gate insulating film 21. The first interlayer insulating film 22 is arranged on the gate insulating film 21. The source line S is arranged on the first interlayer insulating film 22. The source line S is covered with the organic insulating film 23.

The capacitance line C or the counter electrode CE is arranged on the organic insulating film 23. The capacitance line C or the counter electrode CE is covered with the second interlayer insulating film 24.

The pixel electrode PE is arranged on the second interlayer insulating film 24. Moreover, the detection line D is arranged on the second interlayer insulating film 24 and is arranged at the same layer as the pixel electrode PE. The detection line D is arranged right above the source line S and is also located above the capacitance line C. The pixel electrodes PE and the detection line D are covered with the alignment film 25.

On the other hand, the black matrix 31 and the color filter 32 are arranged at the inside of the insulating substrate 30 which constitutes the counter substrate CT. The black matrix 31 is located right above the source line S and the detection line D. The overcoat layer 33 is arranged on the black matrix 31 and the color filter 32. The overcoat layer 33 is covered with the alignment film 34.

The liquid crystal layer LQ is held between the alignment film 25 of the array substrate AR and the alignment film 34 of the counter substrate CT.

A polarizing plate PL1 is arranged on the external surface of the liquid crystal display panel LPN, i.e., the external surface of the insulating substrate 20 which constitutes the array substrate AR. Moreover, a polarizing plate PL2 is arranged on the external surface of another side of the liquid crystal display panel LPN, i.e., the external surface of the insulating substrate 30 which constitutes the counter substrate CT. Especially, in the illustrated example, although the shield electrode is not provided between the insulating substrate 30 and polarizing plate PL2, the mesh type shield electrode SE as shown in FIG. 12 may be arranged, and the conductive paste for adhering the polarizing plate PL2 on the insulating substrate 30 may be also used.

In the example shown in FIG. 19, the back light, which is not illustrated, is arranged so as to face the polarizing plate PL1, and the surface of the polarizing plate PL2 becomes the detection plane. Moreover, the second interlayer insulating film 24 covers the capacitance line C and supports the pixel electrode PE. The capacitance line C corresponds to a liquid crystal driver element, and the detection line D and the capacitance line C correspond to the detection elements, respectively. The second interlayer insulating film 24 is an insulating film which is arranged between two detection elements.

In the second embodiment, the image display mode is same as the first embodiment as explained. The detection mode is carried out by transposing the role of the source line S to the detection line D.

According to the second embodiment, it becomes possible to offer the liquid crystal display device with the detection function at low cost by using the capacitance line C and the detection line D provided on the array substrate AR of the liquid crystal display panel LPN as the detection elements.

Moreover, since it is not necessary to form a slit in the capacitance line C, it becomes possible to suppress the increase in the resistivity of the capacitance line C without providing the auxiliary capacitance line, etc.

In the example shown in FIG. 18, etc., although the detection line D is arranged right above each source line S, that is, the same number of the detection lines D as the source lines S are arranged in the active area ACT, the number is not limited to this example. For example, the detection lines D may be arranged by being thinned out.

Figure 20:
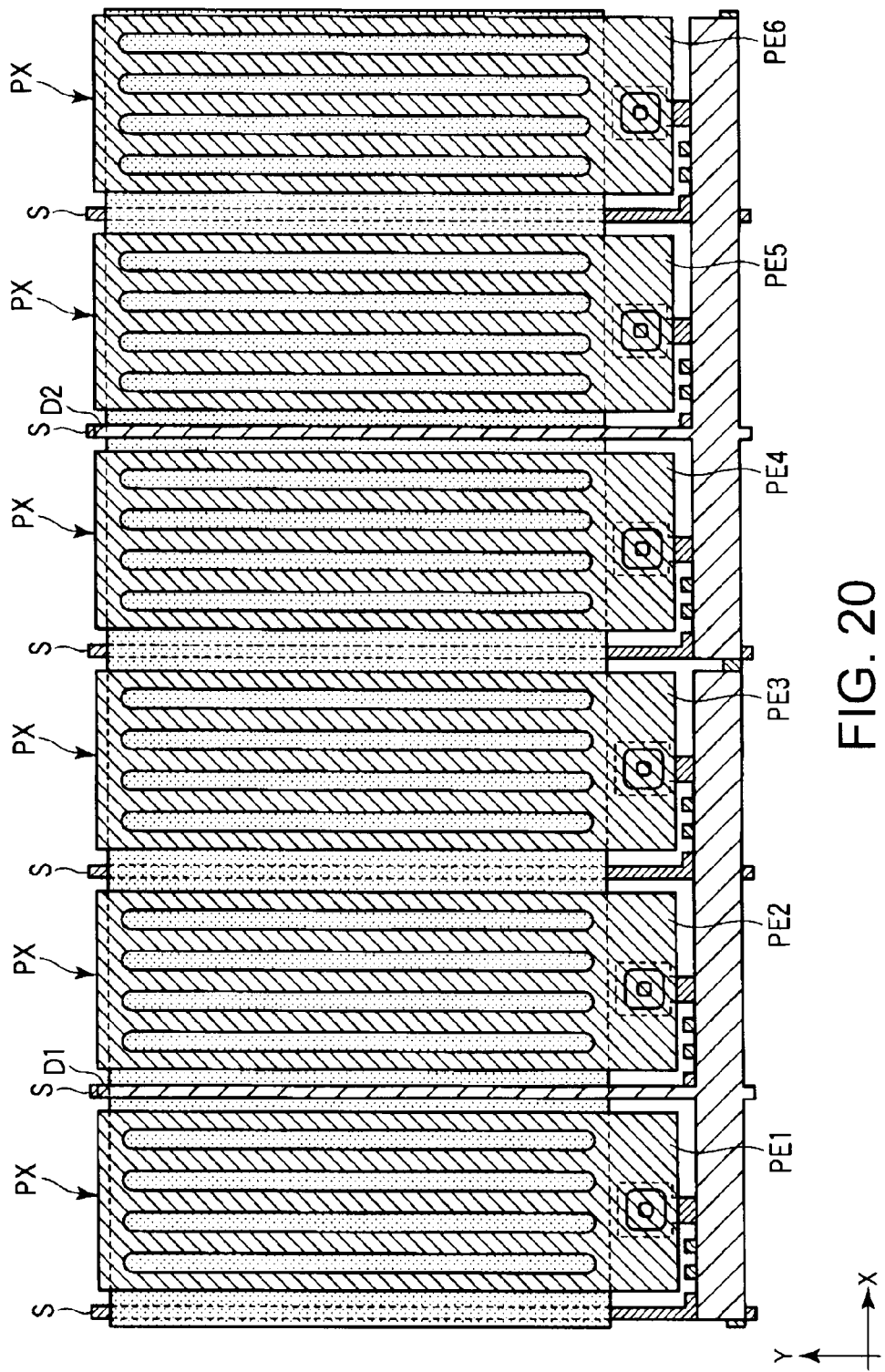
FIG. 20 is a plan view showing other pattern of the pixels on the array substrate shown in FIG. 2 looking from the counter substrate side.

FIG. 20 is a plan view showing other pattern of the pixels on the array substrate shown in FIG. 2 looking from the counter substrate side. Here, six pixels PX located in a line in the X direction are illustrated.

One detection line D is arranged per three pixel PXs located in a line in the X direction. More specifically, the detection line D1 is arranged between a pixel electrode PE1 and a pixel electrode PE2 which adjoins the pixel electrode PE1 and is located above the source line S. In addition, the detection line D is not arranged between the pixel electrode PE2 and a pixel electrode PE3 which adjoins the pixel electrode PE2. Moreover, the detection line D2 is arranged between a pixel electrode PE4 and a pixel electrode PE5 which adjoins the pixel electrode PE4 and is located above the source line S. In addition, the detection line D is not arranged between the pixel electrode PE5 and a pixel electrode PE6 which adjoins the pixel electrode PE5. Moreover, the detection line D is not arranged between the pixel electrode PE3 and the pixel electrode PE4.

Three pixel electrodes PE2, PE3, and PE4 are arranged between two detection lines D1-D2 which adjoin in the X direction. In the illustrated example, although the detection line D is arranged every three pixels, the detection line D may be arranged not only this but every plurality of pixels. That is, two or more pixel electrodes PE may be arranged between the adjoining detection lines D.

In the example shown in FIG. 19, although the detection line D and the pixel electrode PE are arranged in the same layer, the detection line D and the pixel electrode PE may be arranged in different layers through an interlayer insulating film.

Figure 21:
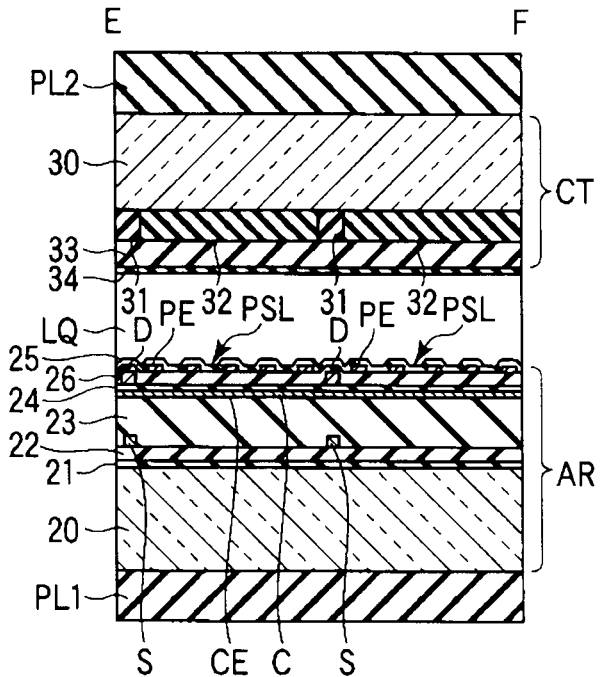
FIG. 21 is a cross-sectional view of other pixels taken along line E-F of FIG. 18.

FIG. 21 is a cross-sectional view of other pixels PX taken along line E-F of FIG. 18.

The detection line D is arranged on the second interlayer insulating film 24. The detection line D is located above the source line S. Since the slit is not formed in the capacitance line C including the counter electrode CE, the capacitance line C is located between the source line S and the detection line D. The detection line D is covered with a third interlayer insulating film 26. The third interlayer insulating film 26 is arranged also on the second interlayer insulating film 24.

The pixel electrode PE is arranged on the third interlayer insulating film 26. The pixel electrode PE is located above the counter electrode CE through the second interlayer insulating film 24 and the third interlayer insulating film 26. The slits PSL are formed in the pixel electrode PE. The pixel electrode PE is covered with the alignment film 25.

In addition, other structures of the array substrate AR or the structure of the counter substrate CT is the same as those of the example shown in FIG. 19.

Moreover, the positional relationship between the detection line D and the pixel electrode PE may make reverse, not restricted to the example shown in FIG. 21. That is, while the pixel electrode PE is arranged on the second interlayer insulating film 24, the detection line D may be arranged on the third interlayer insulating film 26.

Figure 22:
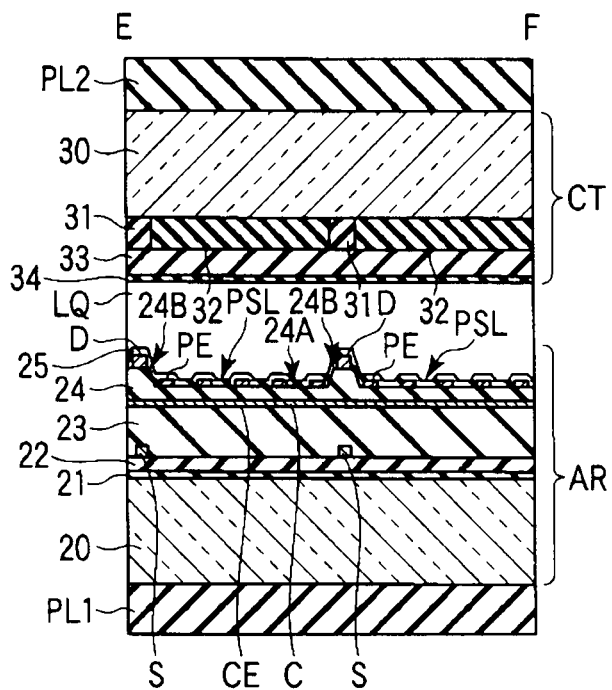
FIG. 22 is a cross-sectional view of other pixels taken along line E-F of FIG. 18.

FIG. 22 is a cross-sectional view of other pixels taken along line E-F of FIG. 18.

The capacitance line C including the counter electrode CE is covered with the second interlayer insulating film 24. The second interlayer insulating film 24 includes a concave portion 24A in a region between adjoining source lines S and a convex portion 24B right above the source line S. Although the second interlayer insulating film 24 may be a single layer structure, laminated two or more layers may be used.

The detection line D and the pixel electrode PE are arranged on the second interlayer insulating film 24 like the example shown in FIG. 19. However, the pixel electrode PE is arranged on the concave portion 24A of the second interlayer insulating film 24, and the detection line D is arranged on the convex portion 24B of the second interlayer insulating film 24.

The capacitance line C is arranged above the source line S through the organic insulating film 23, and further, the detection line D is arranged on the capacitance lines C through the second interlayer insulating film 24. On the other hand, the pixel electrode PE in which the slits PSL are formed is arranged above the counter electrode CE through the second interlayer insulating film 24. The detection line D and the pixel electrode PE are covered with the alignment film 25.

In addition, other structures of the array substrate AR or the structure of the counter substrate CT, is the same as those of the example shown in FIG. 19.

Moreover, the positional relationship between the detection line D and the pixel electrode PE may make reverse, not restricted to the example shown in FIG. 22. That is, while the pixel electrode PE is arranged at the convex portion 24B of the second interlayer insulating film 24, the detection line D may be arranged at the concave portion 24A of the second interlayer insulating film 24.

In the embodiment explained above, although the liquid crystal display panel LPN adopts FFS mode, other liquid crystal mode may be applied to the liquid crystal display panel LPN.

Figure 23:
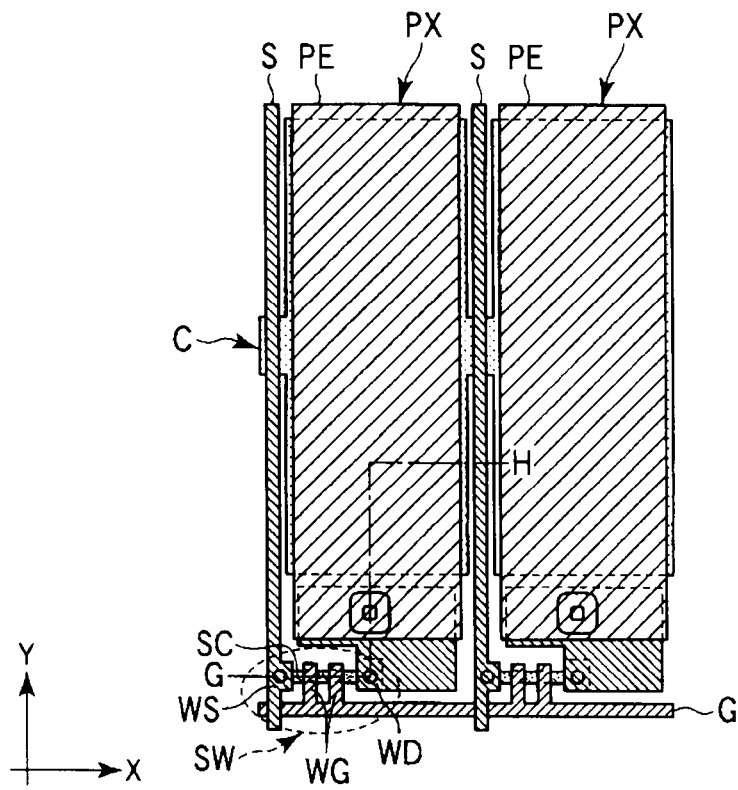
FIG. 23 is a plan view showing a structure of pixels constituting a liquid crystal display panel of TN mode looking from the counter substrate side.

FIG. 23 shows a third embodiment according to the present invention. FIG. 23 is a plan view showing a structure of pixels constituting the liquid crystal display panel of TN (twisted nematic) mode looking from the counter substrate side.

The gate line G extends in the X direction, and the source line S extends in the Y direction. The switching element SW having a semiconductor layer SC is arranged near the intersection portion of the gate line G and the source line S.

The gate electrode WG of the switching element SW is located right above the semiconductor layer SC and is electrically connected to the gate line G. The source electrode WS of the switching element SW is electrically connected to the source line S. The drain electrode WD of the switching element SW is electrically connected to the pixel electrode PE. The capacitance line C extends in the X direction. The pixel electrode PE of each pixel PX is arranged above the capacitance line C.

Figure 24:
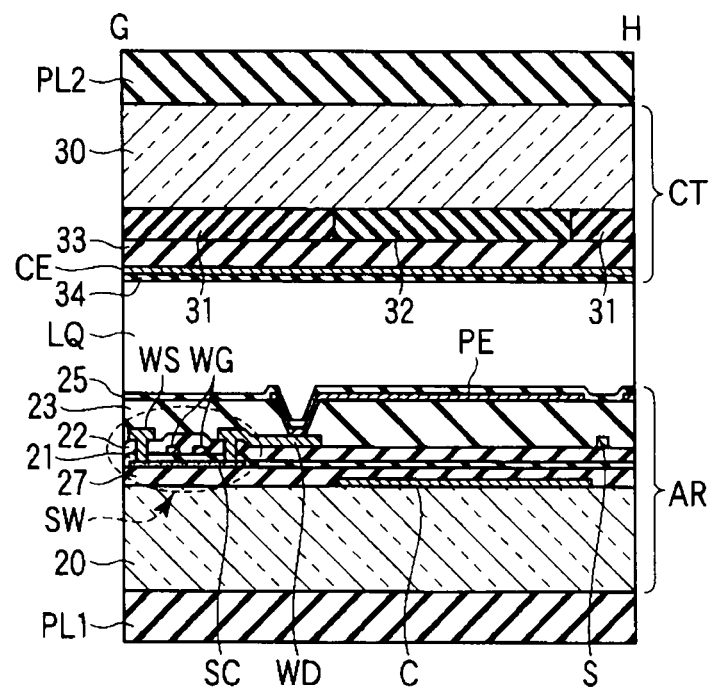
FIG. 24 is a cross-sectional view of the pixel taken along line G-H of FIG. 23.

FIG. 24 is a cross-sectional view of the pixel PX along line G-H of FIG. 23.

That is, the capacitance line C is formed in the inside of the insulating substrate 20 which constitutes the array substrate AR. The capacitance line C is covered with an interlayer insulating film 27. The semiconductor layer SC of the switching element SW is arranged on the interlayer insulating film 27. The semiconductor layer SC is covered with the gate insulating film 21. Moreover, the gate insulating film 21 is arranged also on the interlayer insulating film 27.

The gate electrode WG of the switching element SW is arranged on the gate insulating film 21 and is located right above the semiconductor layer SC. The gate electrode WG is covered with the first interlayer insulating film 22. Moreover, the first interlayer insulating film 22 is arranged also on the gate insulating film 21.

The source electrode WS and the drain electrode WD of the switching element SW are arranged on the first interlayer insulating film 22. The source electrode WS and the drain electrode WD are in contact with the semiconductor layer SC through a contact hole which penetrates the gate insulating film 21 and the first interlayer insulating film 22. Moreover, the source line S is arranged on the first interlayer insulating film 22.

The source electrode WS, the drain electrode WD, and the source line S are covered with the organic insulating film 23. Moreover, the organic insulating film 23 is arranged also on the first interlayer insulating film 22.

The pixel electrode PE is arranged on the organic insulating film 23. The pixel electrode PE is connected to the drain electrode WD through a contact hole which penetrates the organic insulating film 23. The pixel electrode PE is covered with the alignment film 25.

On the other hand, the black matrix 31 and the color filter 32 are arranged on the inside surface of the insulating substrate 30 which constitutes the counter substrate CT. The overcoat layer 33 is arranged on the black matrix 31 and the color filter 32. The counter electrode CE is arranged on the overcoat layer 33. The counter electrode CE is covered with the alignment film 34.

The liquid crystal layer LQ is held between the alignment film 25 of the array substrate AR and the alignment film 34 of the counter substrate CT.

A polarizing plate PL1 is arranged on the external surface of the insulating substrate 20 which constitutes the array substrate AR. Moreover, a polarizing plate PL2 is arranged on the external surface of the insulating substrate 30 which constitutes the counter substrate CT.

In the embodiment shown in FIG. 24, a back light which is not illustrated is arranged so as to face the polarizing plate PL2, and the surface of the polarizing plate PL1 becomes the display surface and the detection plane. Moreover, in the embodiment shown in FIG. 24, the source line S and the capacitance line C are liquid crystal driver elements required for driving the liquid crystal layer LQ respectively, and are also detection elements required for sensing the touch by an object. The interlayer insulating film 27, the gate insulating film 21, and the first interlayer insulating film 22 are the insulating films which are arranged between two detection elements.

Even if the liquid crystal display panel LPN in the TN mode is used, the same effect as the case where the liquid crystal display panel LPN in the FFS mode mentioned above is used is acquired.

While certain embodiments have been described, the embodiments have been presented by way of example only, and are not intended to limit the scope of the inventions. In practice, the structural elements can be modified without departing from the spirit of the invention. Various embodiments can be made by properly combining the structural elements disclosed in the embodiments. For example, some structural elements may be omitted from all the structural elements disclosed in the embodiments. Furthermore, structural elements in different embodiments may properly be combined. The accompanying claims and their equivalents are intended to cover such forms or modifications as would fall with the scope and spirit of the inventions.

What is claimed is:

1. A liquid crystal display device having a plurality of pixels, comprising:
   a first substrate including:
      an insulating substrate,
      a plurality of signal lines arranged above the insulating substrate and extending in a first direction,
      a first insulating film covering the signal lines,
      a plurality of capacitance lines arranged on the first insulating film and extending in a second direction crossing the first direction, each capacitance line including a slit formed above a portion of a respective signal line and extending in the first direction,
      a second insulating film covering the capacitance lines, and
      a plurality of pixel electrodes arranged on the second insulating film so as to face the capacitance lines, the respective pixel electrodes including a plurality of slits, and
   a second substrate opposing to the first substrate;
   a liquid crystal layer held between the first and second substrates and including liquid crystal molecules; and
   a detection circuit to detect change of electrostatic capacitance between the signal lines and the capacitance lines; wherein
   the capacitance lines include a common electrode arranged in common to the plurality of pixels, and the liquid crystal molecules are switched mainly using a lateral electric field between the common electrode and the pixel electrode; and
   the detection circuit writes a detection signal into the plurality of capacitance lines simultaneously by grouping the capacitance lines of adjacent rows of pixels during a detection period successive to an image signal write-in period to write the image signal into the pixel electrode, and thereby detects the change of the electrostatic capacitance between the signal lines and the capacitance lines.

2. The liquid crystal display device according to claim 1, further comprising a gate line extending in the second direction, and a switching element electrically connected with the signal lines, the gate line, and the pixel electrode.

3. The liquid crystal display device according to claim 1, further comprising an auxiliary capacitance line electrically connected with the capacitance lines and extending in the second direction.

4. The liquid crystal display device according to claim 1, further comprising a transmissive mesh type shield electrode or a transmissive conductive paste arranged on an external surface of the second substrate opposing to the first substrate and a polarizer arranged on the external surface of the second substrate through the shield electrode or the transmissive conductive paste.

5. The liquid crystal display device according to claim 1, further comprising a driver IC chip including an image signal writing circuit to write the image signal into the pixel electrode and the detection circuit.

* * * * *